(12) United States Patent
Verbinnen

(10) Patent No.: US 10,710,184 B2
(45) Date of Patent: Jul. 14, 2020

(54) METHOD FOR MANUFACTURING OF A ROTOR

(75) Inventor: Jozef Carlo Verbinnen, Wilrijk (BE)

(73) Assignee: Atlas Copco Airpower, N.V., Wilrijk (BE)

( * ) Notice: Subject to any disclaimer, the term of this patent is extended or adjusted under 35 U.S.C. 154(b) by 185 days.

(21) Appl. No.: 13/981,117

(22) PCT Filed: Jan. 28, 2011

(86) PCT No.: PCT/BE2011/000004
§ 371 (c)(1),
(2), (4) Date: Jul. 23, 2013

(87) PCT Pub. No.: WO2012/100307
PCT Pub. Date: Aug. 2, 2012

(65) Prior Publication Data
US 2013/0309944 A1    Nov. 21, 2013

(30) Foreign Application Priority Data

Jan. 24, 2011   (BE) .................................. 2011/0036

(51) Int. Cl.
*B23F 15/08*   (2006.01)
*B24B 19/02*   (2006.01)
(Continued)

(52) U.S. Cl.
CPC .............. *B23F 15/08* (2013.01); *B23Q 3/157* (2013.01); *B24B 5/01* (2013.01); *B24B 5/16* (2013.01);
(Continued)

(58) Field of Classification Search
None
See application file for complete search history.

(56) References Cited

U.S. PATENT DOCUMENTS 4,907,374 A * 3/1990 Brill .......................... B24B 5/01
                                                          409/231
5,025,689 A * 6/1991 Mayer ...................... B23B 5/18
                                                          82/1.11
(Continued)

FOREIGN PATENT DOCUMENTS

CN         1671508 A      9/2005
CN       101637878 A      2/2010
(Continued)

OTHER PUBLICATIONS

International Search Report from corresponding PCT Application No. PCT/BE2011/000004, dated Sep. 28, 2011.
(Continued)

*Primary Examiner* — Brian D Keller
(74) *Attorney, Agent, or Firm* — Workman Nydegger

(57) ABSTRACT

A method for manufacturing a rotor includes the following operations: the clamping of a workpiece in a grinding machine; the performance of one or more cylindrical grinding operations whereby a rotor shaft section is ground to the desired diameter with a cylindrical grinding disk; the performance of one more profile grinding operations whereby a rotor body is profiled with a profile grinding disk. During the manufacture of the rotor in the grinding machine, the workpiece is not undamped and the cylindrical grinding operations and the profile grinding operations are done with the same grinding machine.

20 Claims, 9 Drawing Sheets

(51) Int. Cl.
  *B24B 5/16* (2006.01)
  *B24B 5/01* (2006.01)
  *B24B 27/00* (2006.01)
  *B23Q 3/157* (2006.01)
  *B24B 29/00* (2006.01)
(52) U.S. Cl.
  CPC ........ *B24B 19/022* (2013.01); *B24B 27/0076* (2013.01); *B24B 29/005* (2013.01)

(56) References Cited

U.S. PATENT DOCUMENTS

| | | | |
|---|---|---|---|
| 5,980,364 A * | 11/1999 | Bentley | B23D 45/046 |
| | | | 451/178 |
| 6,666,748 B2 | 12/2003 | Hiramoto et al. | |
| 6,685,536 B1 | 2/2004 | Junker | |
| 7,147,547 B2 | 12/2006 | Junker | |
| 7,424,776 B2 * | 9/2008 | Shoji | B23B 5/18 |
| | | | 279/106 |
| 8,157,271 B2 | 4/2012 | Sato et al. | |
| 8,313,357 B2 | 11/2012 | Heyder | |
| 8,421,987 B2 | 4/2013 | Hoshino et al. | |
| 8,749,750 B2 | 6/2014 | Hoshino et al. | |
| 2002/0028628 A1 | 3/2002 | Hiramoto et al. | |
| 2003/0054736 A1 * | 3/2003 | Hagan | B24B 9/065 |
| | | | 451/44 |
| 2004/0254671 A1 | 12/2004 | Uehara et al. | |
| 2007/0231096 A1 | 10/2007 | Shoji et al. | |
| 2008/0139092 A1 * | 6/2008 | Lessway | B23Q 1/76 |
| | | | 451/408 |
| 2010/0029183 A1 * | 2/2010 | Heyder | B23F 15/08 |
| | | | 451/47 |
| 2010/0181712 A1 * | 7/2010 | Himmelsbach | B24B 5/421 |
| | | | 269/35 |
| 2010/0302486 A1 | 12/2010 | Hoshino et al. | |
| 2013/0208226 A1 | 8/2013 | Hoshino et al. | |

FOREIGN PATENT DOCUMENTS

| | | |
|---|---|---|
| DE | 3620047 A1 | 1/1987 |
| DE | 202006000290 U1 | 3/2006 |
| EP | 1184134 A2 | 3/2002 |
| EP | 1 974 842 A1 | 10/2008 |
| JP | S60170789 A | 9/1985 |
| JP | 62034772 A | 2/1987 |
| JP | 2000267842 A | 9/2000 |
| JP | 2002066850 A | 3/2002 |
| JP | 2006071229 A | 3/2006 |
| JP | 2007245282 A | 9/2007 |
| JP | 2008-246632 A | 10/2008 |
| JP | 2009172798 A | 8/2009 |
| JP | 2010-042489 A | 2/2010 |

OTHER PUBLICATIONS

Lorenz et al., "Grinding Screw Rotors," VDI Reports, No. 859, 1990, 40 Pages.

* cited by examiner

METHOD FOR MANUFACTURING OF A ROTOR

BACKGROUND

The present invention relates to a method for manufacturing a rotor, such as a rotor for a compressor, a blower, a vacuum pump, or an expander.

SUMMARY

More specifically the invention relates to such a method that can be used to manufacture a screw rotor for a compressor, a blower, a vacuum pump or an expander.

As is known a rotor of a compressor, a blower, a vacuum pump or expander consists of a rotor body that is on a rotor shaft.

The rotor body has a spiral or screw form, for example, with a rather complicated profile.

The contours of the rotor body can be mounted between two end faces and within an external cylinder casing.

The rotor shaft generally has different cylindrical sections with varying shaft diameters, such as a section for driving the rotor shaft, sections for fitting bearings, sections for fitting a seal and so on.

At the transition between successive cylindrical sections of the rotor shaft, there are often also radially oriented surfaces that are perpendicular to the rotor axis and which can be important, for example as a contact surface for bearings and such.

It is also known that many grinding operations are needed to manufacture such complicated shapes, after the preliminary operations (for example milling, drilling, turning and/or similar).

These grinding operations can be divided into two major groups.

More specifically the manufacture of the aforementioned cylindrical sections of the rotor shaft or the cylindrical contours of the rotor body require a number of cylindrical grinding operations.

In such cylindrical grinding operations a multiple oblique or straight insert grinding technique is generally applied.

For this a cylindrical grinding disk, for example of corundum or CBN, is placed at an oblique angle or otherwise with respect to the workpiece, and moved one or more times in a direction towards the workpiece, such that the profile is copied in the workpiece in a number of places.

As an alternative to insert grinding another cylindrical grinding operation can also be applied where use is made of a peel grinding technology.

With this peel grinding technique, a cylindrical grinding disk can move in any direction so that any shape (diameter, cone, end face, radius) can be worked.

This peel grinding technique is thus much more flexible compared to the insert grinding technology, as with the same geometry of cylindrical grinding disk, practically any contour can be worked.

Characteristic of cylindrical grinding disks is the fact that these cylindrical grinding disks have a rectangular or stepped profile.

Moreover, the end faces of the rotor body and the radially oriented surfaces of the rotor shaft also require a grinding operation that can be considered as a shoulder grinding operation, but which for the simplicity of this text will also be called a cylindrical grinding operation.

Such a cylindrical grinding operation for the realisation of the end faces and other radially oriented surfaces can be done by side grinding, whereby a cylindrical grinding disk undergoes a rotation along a direction transverse to the surface to be ground.

This technique is called straight insert grinding.

A more efficient way to grind end faces of the rotor body, or other radially oriented surfaces on the rotor shaft, consists of moving the grinding disk towards the surface to be ground in the direction of the rotation axis of the grinding disk, so that the side of the grinding disk grinds the surface concerned.

This last grinding technique is known under the name of cross grinding.

End faces on the rotor body or other radially oriented surfaces on the rotor shaft can be most efficiently ground by means of oblique insert grinding.

The axis of rotation of the grinding disk is in this case at an oblique angle with respect to the surface to be ground (this angle is generally 30°).

A square profile is dressed onto the grinding disk, that is moved perpendicularly to the rotation axis of the grinding disk to the workpiece, so that an end face or other radially oriented surface, and a diameter of the rotor shaft are ground at the same time.

In order to work on the end faces at both ends of the rotor:
the rotor must be reversed after doing the first shaft end, or
there must be two grinding spindles in the grinding machine that are mirror images of one another with regard to the insertion angle In the aforementioned grinding operations to grind the end faces of the rotor body and/or other radially oriented surfaces, a grinding disk can be used that is identical to the aforementioned cylindrical grinding disk, which explains why such a grinding operation, more specifically a shoulder grinding operation in the form of a straight or oblique insert grinding operation or in the form of a cross grinding operation, is also called a cylindrical grinding operation in this text.

To form the profile of the rotor body an entirely different type of grinding operation is required, i.e. a profile grinding operation with a profile grinding disk.

Starting with an unfinished, previously cast or milled workpiece, the rotor body is ground into the desired profile during the profile grinding operation.

Profile grinding disks are used for this purpose, which, as the name suggests, have an appropriate profile to realise the desired non-rectilinear profile of the rotor body.

This profile is for example typically a curved profile for the realisation of the spiral for rotors of a screw compressor, a blower, a vacuum pump or an expander.

The profile grinding operation to grind the profile of the rotor body, in which a spiral worm grinding disk is used is often also called a hob grinding operation in the trade.

In this text all grinding operations that are intended to realise the spiral profile of the rotor body are called profile grinding operations, and the grinding disk used a profile grinding disk.

According to the known methods for manufacturing a rotor for a compressor, a blower, a vacuum pump, an expander, the cylindrical grinding operations (including the grinding operations for the end faces of the rotor body and for other radially oriented surfaces of the rotor shaft) and the profile grinding operations are done on different grinding machines, whereby all cylindrical grinding operations are usually done first on a cylindrical grinding machine and then the profile grinding operations on a profile grinding machine.

Disadvantages of an economic nature are attached to these known methods, as well as with regard to the quality yielded.

First and foremost two different types of grinding machine, that use a different technology, have to be purchased and maintained, which is of course an expensive matter.

Moreover, such grinding machines occupy a lot of space, which can mean an additional cost.

The setting up and adjustment of the two types of grinding machine for manufacturing a certain rotor require a lot of work.

Moreover, every workpiece first has to be clamped (one or more times) in a cylindrical grinding machine, and then taken from this cylindrical grinding machine after doing the cylindrical grinding operations concerned, and then clamped in a profile grinding machine to do the profile grinding operations to form the rotor.

All these steps require a lot of labour and time, such that the lead time for manufacturing a rotor is considerable.

Another disadvantage attached to this is that there is a considerable difference between the time that a workpiece spends in a cylindrical grinding machine and the time that this workpiece spends in a profile grinding machine during the manufacture of the rotor.

This means that the capacities of the two types of machine are not utilised to a maximum, which also constitutes an economic loss.

For the people who have to operate the grinding machines, working with two types of grinding machine also requires an intensive form of organisation.

The operating panels of the cylindrical grinding machines differ from the operating panels of the profile grinding machines to such an extent that as a rule these operations cannot be done by the same operators.

With regard to the quality of the rotor finish, the known methods have the first big disadvantage that the workpiece to be ground has to be clamped in a grinding machine a number of times, whereby errors can accumulate and the risk of damage increases.

Indeed, for the good performance of the rotor to be manufactured, it is of paramount importance that the rotor profile is manufactured with a very high degree of accuracy.

More specifically the rotor profile must be very well aligned with respect to the centre line through the sections of the rotor shaft that are used for fitting the supporting bearings.

Because in the known methods these sections of the rotor shaft for the bearings and the profile of the rotor body are manufactured on different machines, clamping errors inevitably occur that are not conducive to the accuracy with which the profile of the rotor body is manufactured.

To clamp the workpiece in the different types of grinding machine, (prior to the cylindrical grinding operations) centre holes are made at both ends of the rotor and the workpiece is clamped in between one or both centre points provided on the grinding machine.

To clamp the workpiece in the grinding machine, in conventional profile grinding machines, a centre point of the grinding machine is only put in the centre hole concerned at one end of the workpiece.

At the other end the workpiece is clamped on a cylindrically ground part of the shaft.

For an accurate finish of the rotor, in the known methods it is thus extremely important that the centre holes are made very accurately.

However, even with an extremely accurate implementation of the centre holes, clamping errors are inevitable due to the multiple clamping of the workpiece.

In addition, every machine has geometric anomalies that also result in errors when working the workpiece, and thus result in a poorer finish and/or lower quality of the rotor.

As the geometric anomalies differ in the machines for the successive operations, in the known methods these errors accumulate during the processing of the workpiece.

Moreover, there is a substantial risk that the workpiece is damaged by being clamped a number of times, for example the functional parts of the rotor, but also the aforementioned centre holes.

Another disadvantage of the known methods for manufacturing a rotor of a compressor, a blower, a vacuum pump, or an expander, that is detrimental to the quality relates to the order of operations.

Indeed, in the known methods all cylindrical grinding operations are done first, because the sections of the rotor shaft that support the bearings are also manufactured with cylindrical grinding operations.

One of these sections of the rotor shaft is also used to centre, clamp and drive the rotor for the profile grinding, which is necessary because large forces are generated during profile grinding.

When profile grinding a rotor for a screw compressor, blower, vacuum pump, or expander, one or more coarse profile grinding operations are first done on the workpiece to grind the spiral grooves in the rotor body.

A substantial proportion of the grinding power here is converted into heat that accumulates in the workpiece.

This heat accumulation in the workpiece negatively affects certain parts of the workpiece that have already been cylindrically ground, such as the end faces of the rotor body or for example the cylindrical periphery that encloses the contour of the rotor body.

Another disadvantage attached to the order of operations followed in known methods consists of the coarse profile grinding operation being immediately followed by a fine profile grinding operation, whereby the aforementioned heat that has accumulated in the workpiece is only gradually dissipated during this fine profile grinding operation.

A consequence of this is that, as a result of the temperature change, the dimensions of the workpiece change during fine grinding and thus the profile of the rotor body is not made evenly over the rotor body.

In brief, in a rotor of a screw compressor, a blower, a vacuum pump, or an expander, this can mean for example that the grooves in the rotor are not made uniformly.

Furthermore, when coarse profile grinding the workpiece large burrs can occur at the edges of the end faces of the rotor body and/or the cylindrical contour wall of the rotor body that are not generally removed by simple machine brushing away.

In the known methods there is thus a considerable risk that, when removing these large burrs, damage is caused to the finely ground parts already made by the cylindrical grinding of the rotor, such as the aforementioned end faces or the contour of the rotor body, which are critical parts for the good performance of the rotor.

In the known methods, these large burrs generally have to be removed manually and with great care, which is a delicate process and thus takes up a non-negligible amount of time.

The handling and manual deburring of rotors with such large burrs also means substantial risks of injury.

If both grinding operations (cylindrical grinding and profile grinding) are done with CBN grinding disks, for example when high productivity grinding techniques are used, these grinding operations are generally done with oil, which constitutes an additional safety risk.

Indeed, with oil spills on the production floor the risk of slipping increases substantially, and as in the known methods the workpieces have to be taken one or more times from a cylindrical grinding machine to a profile grinding machine, the risk of oil spills in the known methods is very real.

With the current known methods for manufacturing a rotor for a compressor, blower, vacuum pump, or expander, during the cylindrical grinding and profile grinding the workpiece is driven at one end, and when clamping the workpiece in the grinding machine at the other, not directly driven end of the workpiece, a fixed centre point is generally used that engages in a centre hole in the end of the workpiece concerned.

Consequently there is a big risk that the centre hole at the aforementioned end of the workpiece is damaged by friction during the operation, which can also have a detrimental effect on the quality of the rotor manufactured in subsequent operations.

The purpose of the present invention is thus to provide a solution to the aforementioned disadvantages and any other disadvantages.

To this end the invention concerns a method for manufacturing a screw rotor for a compressor, a blower, a vacuum pump or an expander, that at least comprises the following operations:
- the clamping of a workpiece, that has already been partially processed so that it already has the shape of a rotor, in a grinding machine to perform a grinding operation;
- the performance of one or more cylindrical grinding operations, whereby in such cylindrical grinding with a cylindrical grinding disk, one or more sections of the workpiece are pre-ground to the desired diameter to form a rotor shaft section;
- the performance of one more profile grinding operations, whereby in such profile grinding with a profile grinding disk, a section of the workpiece is profiled to form a rotor body of the screw rotor;

and such that, during manufacture of the screw rotor in the grinding machine, the workpiece is not unclamped and both the cylindrical grinding operations and the profile grinding operations are done with the same grinding machine.

A great advantage of the method according to the invention for manufacturing a rotor consists of only having to clamp the workpiece during the manufacture of the rotor once, and it is not unclamped until the entire rotor has been finished.

This increases the quality yielded because no clamping errors can occur due to the workpiece being clamped a number of times, as is the case with the known methods.

As all grinding operations are done in the same grinding machine, no errors accumulate as a result of geometric anomalies in the machine.

Moreover, in a method according to the invention, the risk of damage being caused to the workpiece is reduced, compared to the risk of damage with the known methods, as the workpiece no longer has to be clamped a number of times.

The accuracy with which the centre holes are realised on the workpiece for its clamping in the grinding machine is also less important in a method according to the invention than in the known methods, as during the entire manufacture of the rotor the workpiece remains clamped in the grinding machine and thus all operations are automatically centred around the centre points on the grinding machine, between which the workpiece is clamped in.

With a method according to the invention, the entire series of operations is done in one grinding machine, which has many advantages.

First of all the investment to be made is less and the space required for grinding machines is less than with the known methods.

The capacity of the grinding machine used can also be fully utilised.

A step-by-step capacity expansion is possible and this leads to a more predictable investment policy over time.

Moreover, only one grinding machine has to be set up beforehand according to the type of workpiece that has to be manufactured.

In addition, no further time is lost by exchanging workpieces between different machines.

When the method according to the invention is applied on two grinding machines simultaneously, that each can do cylindrical grinding operations and profile grinding operations, the production process is less sensitive to production loss as a result of machine faults or as a result of the conversion of one of the machines, compared to the situation with the known methods where one cylindrical grinding machine and one profile grinding machine are used.

Indeed, when according to the known methods for manufacturing a rotor, separate grinding machines are used for the cylindrical grinding and profile grinding, then the production flow is interrupted as soon as one of the two grinding machines has a fault or is converted, such that the entire production capacity is immediately lost.

The degree of utilisation of the grinding machine is thus greater in a method according to the invention than in the known methods.

The process time during which a workpiece remains in one grinding machine is much greater than with the known methods, such that an operator can easily operate a number of grinding machines simultaneously.

The total time required for manufacturing a rotor is thus substantially reduced with a method according to the invention.

According to a preferred method according to the invention, when manufacturing a rotor a universal grinding spindle of the grinding machine is used whereby a grinding disk is taken off the universal grinding spindle after performing a grinding operation and another grinding disk is put on this universal grinding spindle to perform a subsequent grinding operation.

Preferably this exchange of grinding disks is done automatically.

An advantage of this preferred method according to the invention consists of the aforementioned universal grinding spindle being utilised to the optimum.

Such a preferred method according to the invention enables rotors of both the female type and complementary rotors of the male type to be manufactured in some cases, without having to convert the grinding machine, which also means a significant time saving and whereby for example male and female rotors for screw compressors can be manufactured in pairs in one grinding machine.

This means a substantial advantage as the lead time for producing a rotor set and a compressor element is substantially reduced as a result.

This is very important as a compressor element can only be assembled when both rotors are available.

According to another preferred method according to the invention, between two grinding operations a flushport or set of flushports can also be exchanged.

Such flushports can be used to obtain optimum cooling, to extinguish sparks, or to clean the grinding stone during grinding.

Depending on the circumstances, when the geometry of the grinding machine is changed, it can be chosen to exchange or reposition only one such flushport or an entire set of such flushports with their specific function.

Such a preferred method provides the advantage that the conversion times can be substantially reduced, such that the periods in which production has stopped is reduced.

Moreover, grinding disks and flushports can be exchanged without having to stop the grinding machine.

According to a greatly preferred method according to the invention, after the first coarse profile grinding operation to obtain a workpiece with a coarsely ground rotor body, one or more interim cylindrical grinding operations are done to grind one or more rotor shaft sections, an external diameter of the rotor body and/or one or both end faces of the rotor body, after which the profile of the rotor body is finely ground during a fine profile grinding operation.

Such a method according to the invention solves the aforementioned problems of the known methods that are the result of the heat accumulation in the workpiece during the coarse profile grinding of the rotor body, as well as the formation of large burrs from this coarse profile grinding of this rotor body.

Indeed, with this preferred method according to the invention, the profile of the rotor body is first coarsely ground by profile grinding, whereby the large burrs that occur as a result of this coarse profile grinding can be removed during a subsequent fine cylindrical grinding operation.

This can be done by fine grinding the outside diameter and end faces of the rotor body by cylindrical grinding, in order to finally fine grind the profile of the rotor body in a fine profile grinding operation.

A first important advantage is that the burrs are removed by the cylindrical grinding of the critical parts of the rotor body, such that there is less risk of damage when removing the small burrs that occur when fine profile grinding the profile.

In contrast to the large burrs from the coarse profile grinding of the rotor body, these fine burrs can easily be removed with machine brushing.

These fine burrs can be removed in the same machine, for example by replacing a grinding disk on an aforementioned universal grinding spindle with a deburring brush.

Moreover, the workpiece has cooled down when the profile of the rotor body is finally fine ground.

In the known methods in which different grinding machines are used for cylindrical grinding and profile grinding, such an order of the operations is impossible or at least very disadvantageous, as far too much time is lost changing machines, and each time the workpiece is clamped in a grinding machine clamping errors accumulate.

BRIEF DESCRIPTION OF THE DRAWINGS

With the intention of better showing the characteristics of the invention, a preferred method and grinding machine according to the invention is described hereinafter by way of an example, without any limiting nature, with reference to the accompanying drawings, wherein.

DETAILED DESCRIPTION OF VARIOUS EMBODIMENTS

Figure 1:
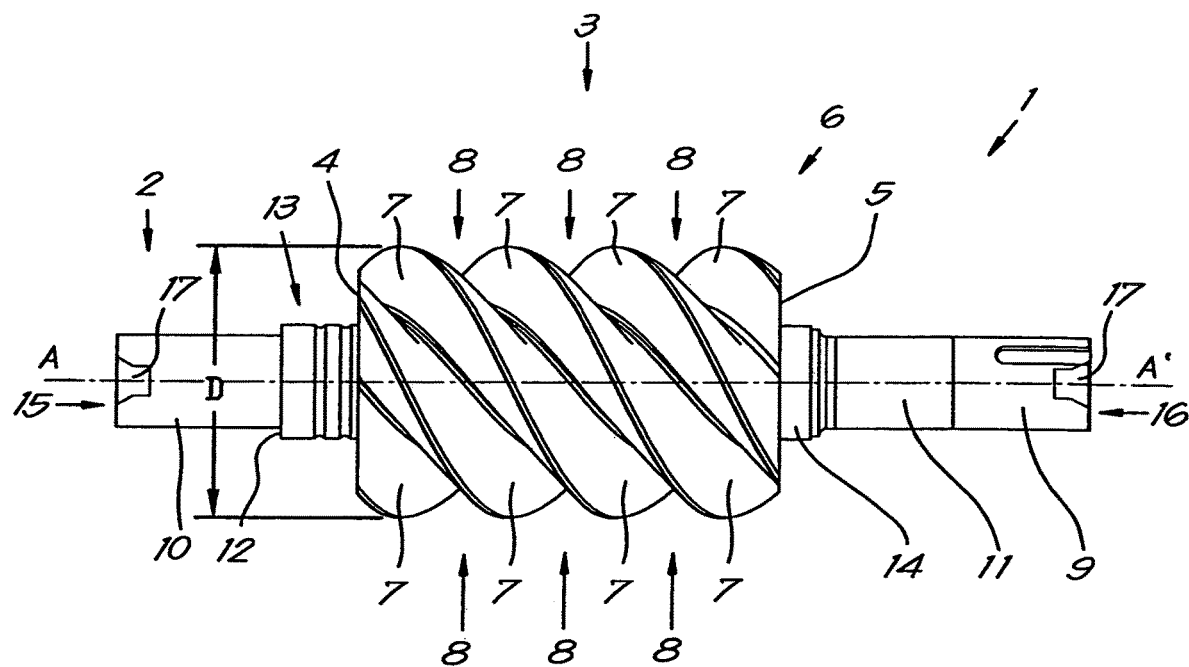
FIG. 1 shows a side view of a rotor of a screw compressor.

The rotor 1 shown in FIG. 1 is a male type rotor 1 for a screw compressor, that consists of a rotor shaft 2 on which there is a rotor body 3.

The rotor body 3 can be contained in a cylindrical body that has an outside diameter D.

The axial ends of the rotor body 3 are formed by two end faces 4 and 5, whereby upon assembly of the rotor 1 in the screw compressor, the end face 4 is specifically intended to be oriented towards an outlet side, while the end face 5 is intended to be oriented towards an inlet side of the compression chamber of the screw compressor.

As the rotor body 3 is intended for compressing or expanding air or another medium in a compressor, vacuum pump or expander, it also has spiral 6, whereby the teeth 7 are separated from one another by grooves 8.

The rotor shaft 2 consists of different sections with varying diameters, both on the inlet shaft side and on the outlet shaft side.

In the example shown, at one end of the rotor shaft 2 there is a suitable section 9 for driving the rotor shaft 2.

Moreover, on each side of the rotor body 3 there is a section for supporting the rotor shaft 2 while rotating with respect to a housing of a screw compressor by means of a bearing, sections 10 and 11 respectively.

In the example shown, adjacent to the section 10 for a bearing of the rotor shaft 2 there is a certain step to form an axial contact surface 12 that is perpendicular to the axis AA' of the rotor 1, and which can act as an axial contact surface 12 for the bearing to be fitted.

Moreover, between sections 10 and 11 for the bearings and the rotor body 3, there is also a section for sealing the rotor 1 in the housing of the screw compressor, sections 13 and 14 respectively.

To clamp and centre the rotor shaft 2 in a grinding machine, there is a centre hole 17 centrally in both ends 15 and 16 of the rotor shaft 2.

It is clear that this complicated shape requires a multitude of different operations.

More specifically the different sections 10 to 14 of the rotor shaft 2, and the external diameter D of the rotor body 3, are obtained by performing a number of cylindrical grinding operations.

Figure 2:
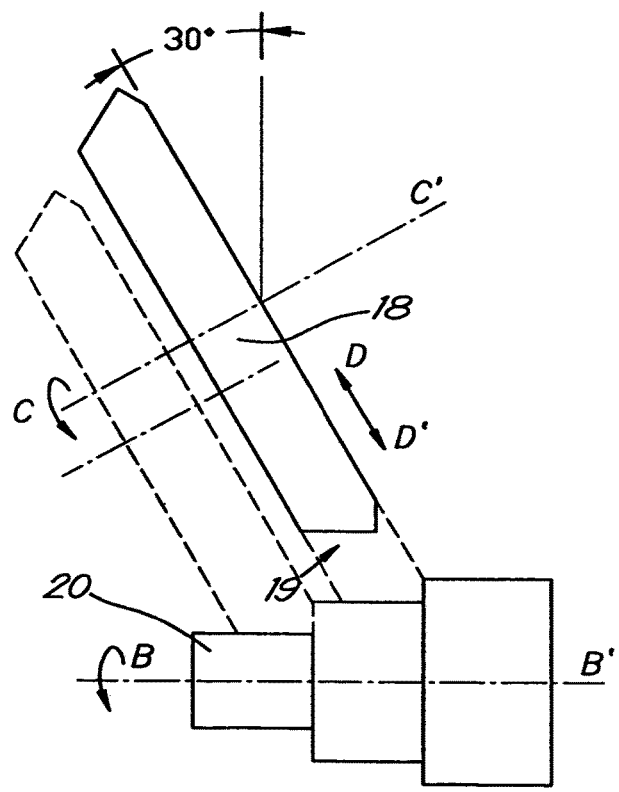
FIG. 2 schematically illustrates a first cylindrical grinding operation, more specifically the oblique multiple insert grinding with a cylindrical grinding disk.

By way of an example, FIG. 2 illustrates such a cylindrical grinding operation, more specifically the multiple oblique insert grinding with a cylindrical grinding disk 18.

Such a cylindrical grinding disk 18 generally has an abrasive such as corundum or CBN (Cubic Boron Nitride) and has a typical cutting profile 19.

In the case of FIG. 2, the cutting profile 19 is such that when the cylindrical grinding disk 18 is obliquely inserted, a part of a shaft can be ground to a certain diameter and a radially oriented surface can be ground on this shaft at the same time.

In this case the workpiece is a shaft 20 that undergoes a rotary movement around its axis BB' and in which the stepped cutting profile 19 of the cylindrical grinding disk 18 is copied a number of times by moving the cylindrical grinding disk 18, which in this example rotates around the oblique axis CC', towards the shaft 20 along the oblique direction DD' during the insert grinding.

In this way the shaft 20 can be given a stepped profile.

Figure 3:
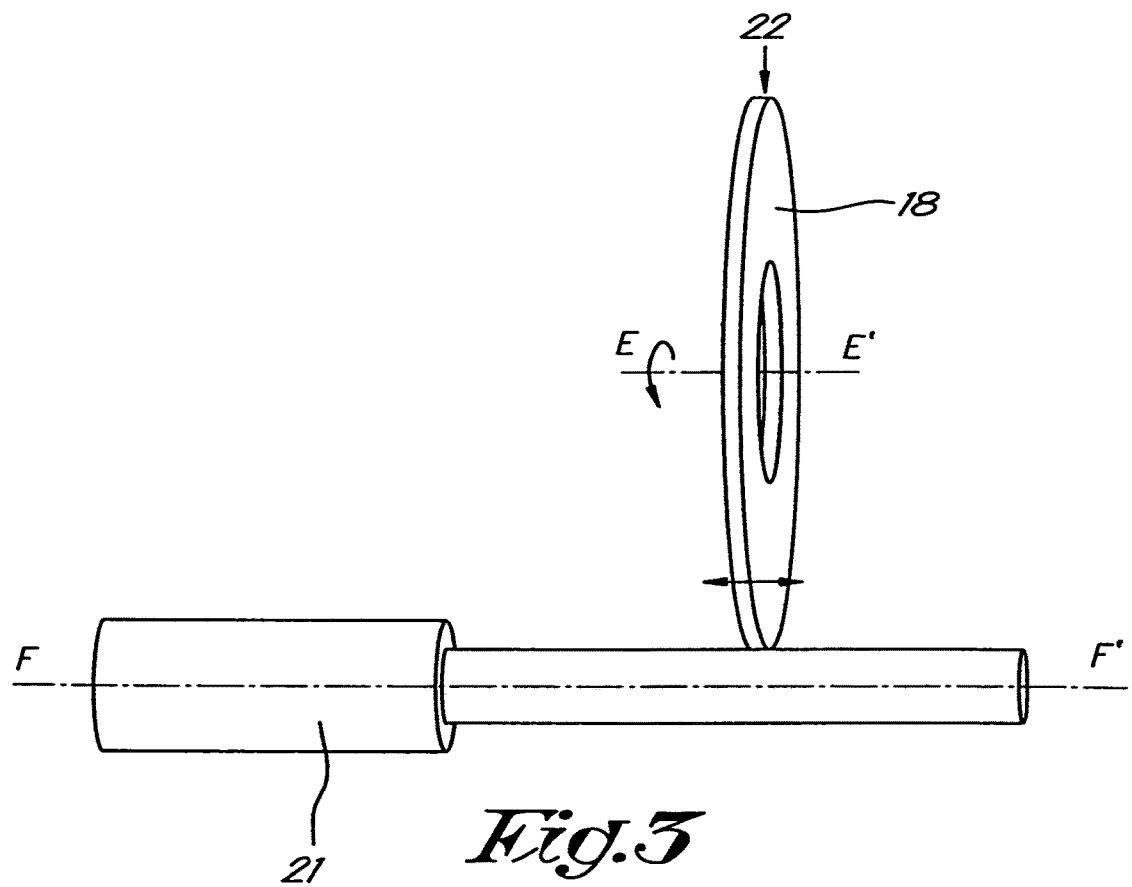
FIG. 3 schematically illustrates a top view of a cylindrical grinding operation, more specifically peel grinding with a cylindrical grinding disk.

Another form of cylindrical grinding shown in FIG. 3, more specifically a peel grinding operation whereby a part of a shaft 21 is ground to a certain diameter with a cylindrical grinding disk 18.

In contrast to what was the case with the insert grinding, when peel grinding the cylindrical grinding disk 18 only undergoes a small feed movement in the direction of the shaft 21, and the further peel grinding is done by moving the rotating cylindrical grinding disk 18 in the longitudinal direction EE' parallel to the shaft direction FF'.

To realise the end faces 4 and 5 of the rotor body 3, and possibly the contact surface 12 between the rotor shaft sections 10 and 13 (see FIG. 1), a grinding operation is required, for example by grinding with a grinding disk end on to the end faces 4 and 5 or the contact surface 12.

A cylindrical grinding disk 18 can also be used for this grinding operation, for example of the type as shown in FIG. 3, and hereinafter such a grinding operation shall also be considered as a cylindrical grinding operation.

Figure 4:
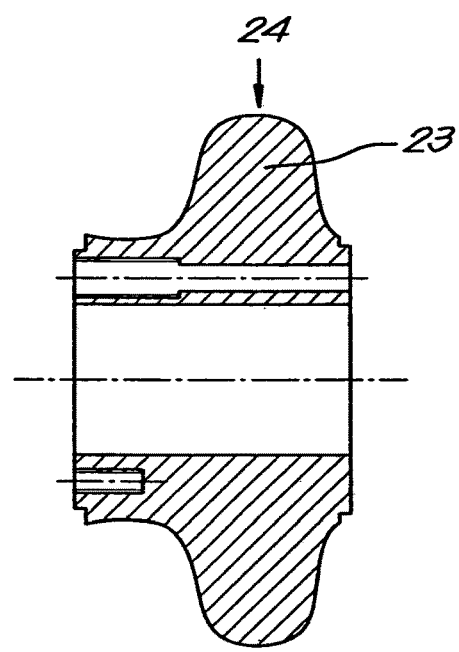
FIGS. 4 and 5 show a cross-section of two possible profile grinding disks (intended for profile grinding a male and female rotor of a screw compressor respectively)
Figure 5:
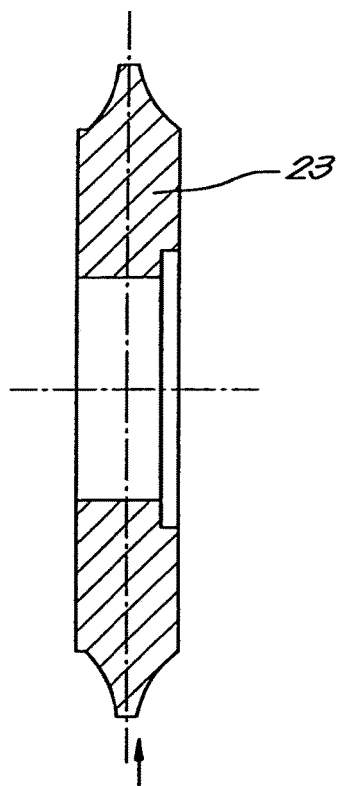

To realise the spiral toothing 6 of the rotor body 3 another grinding operation is needed, i.e. a profile grinding operation using a profile grinding disk 23, a few examples of which are shown in FIGS. 4 and 5.

It is clear that these profile grinding disks 23 have a profile 24 that corresponds to the profile of the spiral grooves 8 of the rotor body 3.

Moreover, the grinding of the spiral toothing 6 requires a combined movement of the workpiece and the profile grinding disk 23 that is much more complicated than with cylindrical grinding.

According to the known methods, the cylindrical grinding and profile grinding are done on different grinding machines, which leads to a number of disadvantages, as set out in the introduction.

The steps that a method according to the invention preferably contains are set out below.

It is of great importance here that in such a method according to the invention, only one grinding machine is used and that the workpiece is not unclamped during the manufacture of the rotor 1.

Figure 6:
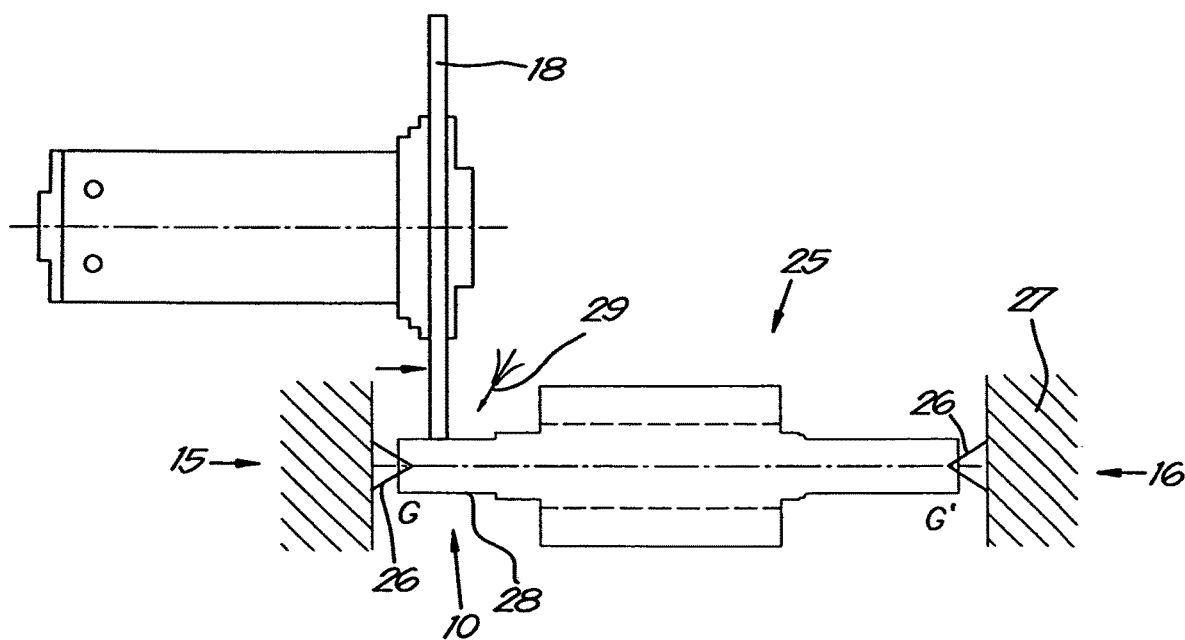
FIGS. 6 and 7 schematically illustrate the first two steps of a method according to the invention for manufacturing a rotor according to FIG. 1, whereby a cylindrical grinding operation is applied in these steps.

FIG. 6 shows a first step of the method, whereby a workpiece 25, that has already been partially processed for example and more or less already has the shape of a rotor 1 as shown in FIG. 1, is clamped by clamping the workpiece 25 in between the two centre points 26 of the grinding machine 27.

After clamping the workpiece 25 between the two centre points 26, a first cylindrical grinding operation is preferably done with a cylindrical grinding disk 18 of the grinding machine 27, which consists of cylindrically grinding the section 10 at the end 15 of the workpiece 25, to obtain a cylindrical clamping surface 28 that is centred with respect to the centreline GG'.

It is clear that for the good removal of the ground material and/or to obtain a certain cooling and lubrication of the workpiece 25 during grinding, it is best to use a flushport 29 or a set of flushports 28.

It can also be the intention to extinguish sparks that occur during grinding with such a flushport 29.

Figure 16:
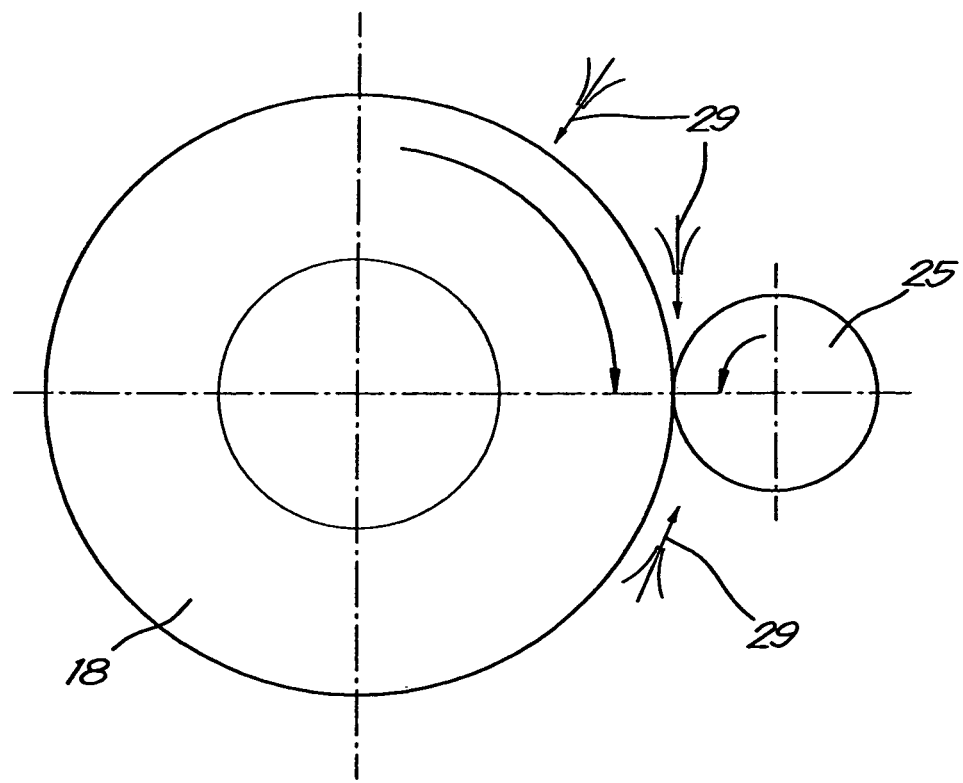
FIG. 16 schematically shows a side view of a set of flushports of the grinding machine.

FIG. 16 shows a typical configuration in which a set of flushports 29 is used to cool, lubricate and clean the grinding disk 18 and the workpiece 25, and to extinguish sparks that occur during grinding.

The flushport 29 to provide cooling and lubrication is placed above the contact zone between the cylindrical grinding disk 18 and the workpiece 25.

This cooling port 29 for cooling and lubrication is oriented in the direction of rotation of the grinding disk to the aforementioned contact zone between the cylindrical grinding disk 18 and the workpiece 25.

The flushport 29 that is intended to extinguish sparks is oriented in a direction opposite to the direction of rotation of the cylindrical grinding disk 18 and towards the aforementioned contact zone between the workpiece 25 and the cylindrical grinding disk 18.

Finally there is a further flushport 29 for cleaning the cylindrical grinding disk 18 that is oriented to a part of the grinding disk 18 in a direction perpendicular to the surface of the grinding disk 18.

When turning the grinding disk 18, a part of the grinding disk 18 will first be cleaned at the flushport 29 concerned, after which this part comes into contact with the workpiece 25 whereby it is lubricated to reduce the development of heat, and whereby the heat released by the grinding is dissipated by cooling and any sparks that occur are extinguished with the flushports 29 concerned.

Of course the same set of flushports 29 can be provided during the profile grinding, and more or fewer flushports 29 can be used and/or configured differently.

Figure 7:
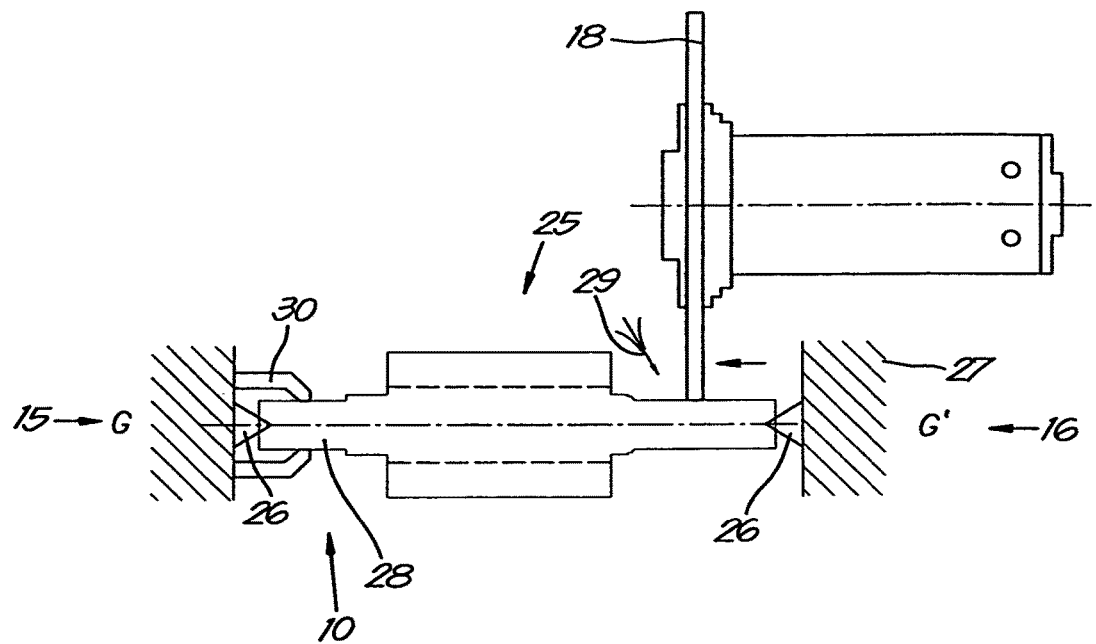

In a subsequent step of the method according to the invention, shown in FIG. 7, the workpiece 25 is first additionally clamped with a clamping mechanism or clamping system 30, that moves towards the workpiece, of the grinding machine 27 that engages around the clamping surface 28 formed in the previous step.

Moreover, a section 11 at the other end 16 of the workpiece 25, for example a section 11 intended for fitting a bearing, but other components are not excluded, is cylindrically ground with a cylindrical grinding disk 18 of the grinding machine 27, either the same cylindrical grinding disk 18 or a different cylindrical grinding disk 18 than in the previous step, to form a cylindrical support surface 31 that is centred with respect to the centre line GG'.

Figure 8:
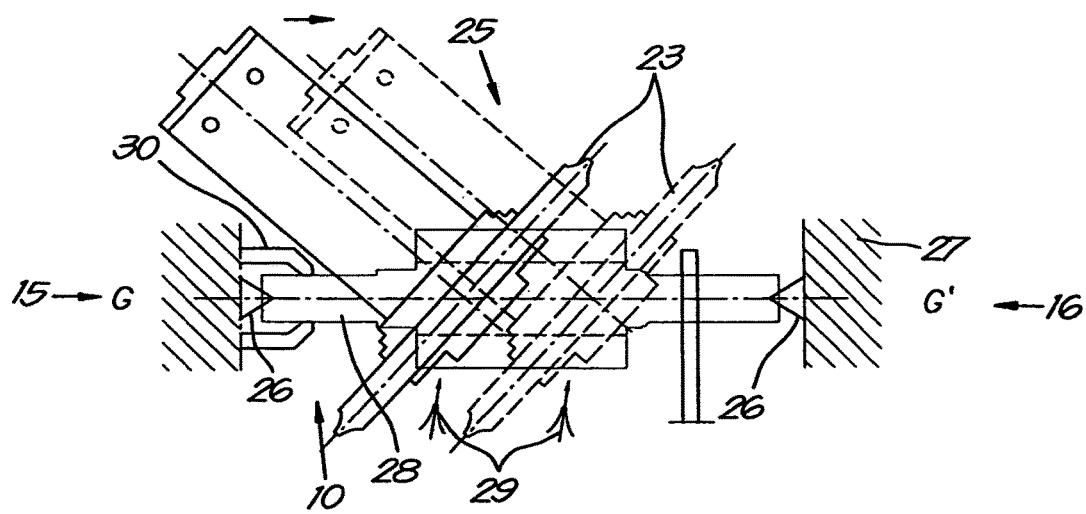
FIGS. 8 and 9 each schematically illustrate a front view of a next step of a method according to the invention to manufacture a male or female rotor of a screw compressor respectively, in which a coarse profile grinding operation is performed.
Figure 9:
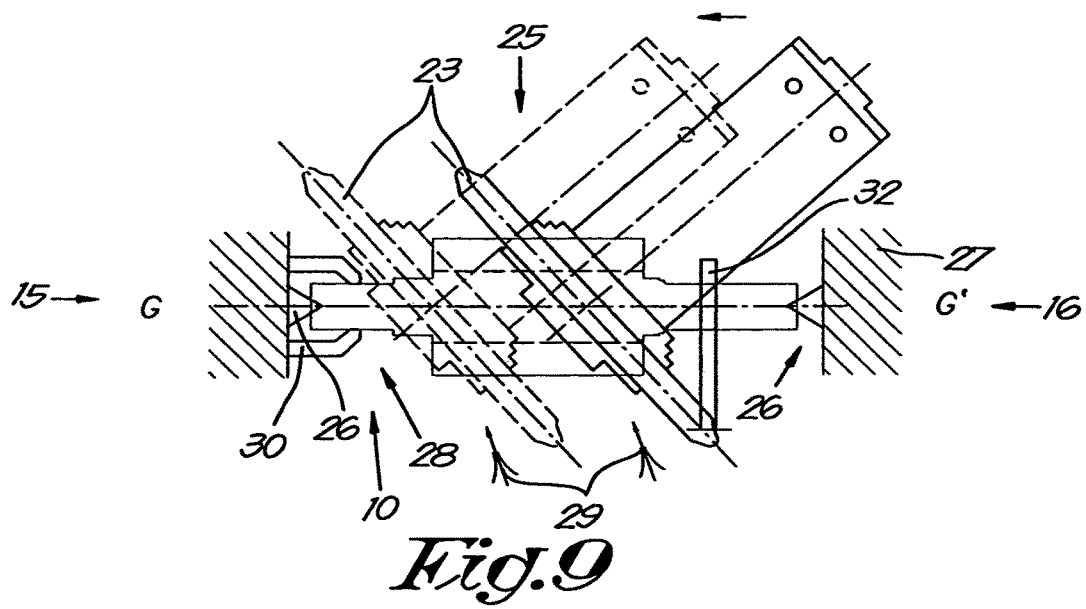

FIGS. 8 and 9 show a subsequent step of the method according to the invention, whereby a coarse profile grinding operation is performed to grind a first coarsely finished spiral toothing 6 of the rotor body 3, respectively for grinding a male rotor 1 and a female rotor 1 of a screw compressor.

To perform a profile grinding operation, the workpiece 25 has to be fully supported at the end 15, whereby it is driven during grinding.

To this end, the workpiece 25 is at least clamped between the centre points 26 and clamped in with a clamping mechanism or clamping system 30 at the end 15.

If desirable for stability, the other end 16 of the workpiece 25 is supported in a rotating way by means of a stay 32 supported on bearings or a sliding stay 32 that is fitted around the support surface 31 ground in the previous step.

In this way the workpiece 25 is sufficiently supported to accommodate the large forces that occur during the profile grinding and/or to prevent or limit the bending of the workpiece 25 during the profile grinding.

To perform the profile grinding operation, a profile grinding disk 23 of the grinding machine 27 is of course used.

It is important to note that, in contrast to what is the case in the known methods, here it is a profile grinding disk 23 of the same grinding machine 27.

The only difference between FIGS. 8 and 9 relates to the orientation of the profile grinding disk 23 in the grinding machine 27, which demonstrates that with the same grinding machine 27 both a female and male rotor 1 for compressors, blowers, vacuum pumps, or expanders, can be easily manufactured, just by changing the orientation of the profile grinding disk 23.

Figure 10:
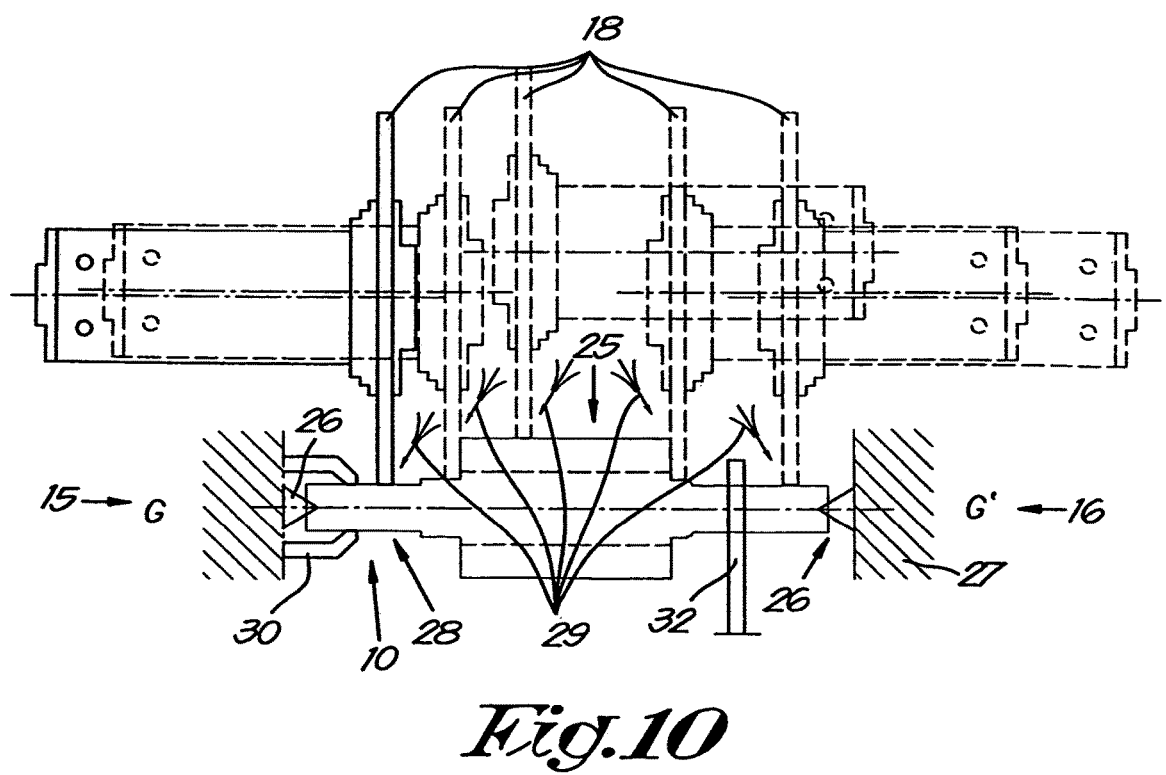
FIG. 10 illustrates a subsequent step of the method according to the invention in which a number of cylindrical grinding operations are done.

After this first coarse profile grinding operation to obtain a workpiece 25 with a coarsely ground rotor body 3, according to the invention, one or more interim cylindrical grinding operations are preferably performed, as illustrated in FIG. 10.

Such cylindrical grinding operations can consist of cylindrically grinding one or more rotor shaft sections, such as the fine cylindrical grinding of the sections 10 to 14 or the external diameter D of the rotor body 3.

In such interim cylindrical grinding operations, one or both end faces 4 and 5 of the rotor body 3 are finely ground.

For these interim grinding operations, a cylindrical grinding disk 18 of the grinding machine 27 is again used.

The advantages of performing these interim grinding operations primarily consist of the fact that the fine grinding of the parts concerned is only done after the profile of the rotor body 3 has already been ground into its rough shape, so that the negative effects of the coarse profile grinding, such as the accumulation of heat in the workpiece 25, deburring, and so on, can no longer affect the finish of the rotor 1.

According to a preferred method according to the invention, one of the steps consists of a deburring operation with the same grinding machine 27.

The large burrs can be deburred, for example, by cylindrical grinding the end faces 4 and 5 of the rotor body 3 and/or the outside diameter D of the rotor body 3.

In a subsequent step of the method, the spiral toothing 6 of the rotor body 3 can be finely ground using a profile grinding disk 23 with a fine grain and accurate profile.

Figure 11:
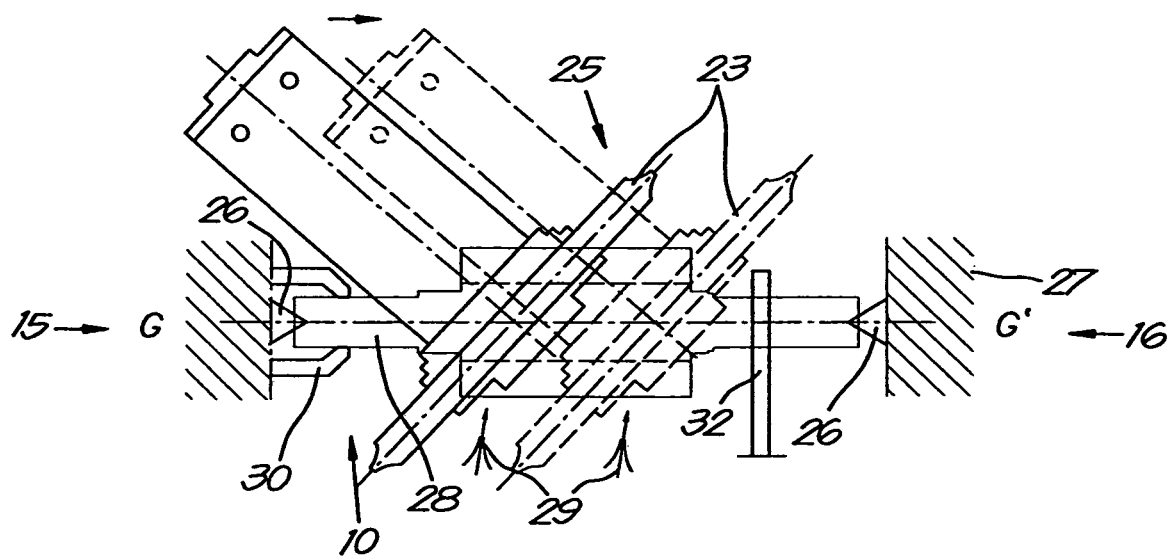
FIGS. 11 and 12 illustrate, analogous to FIGS. 8 and 9, the fine profile grinding of a male and female rotor for a screw compressor respectively.
Figure 12:
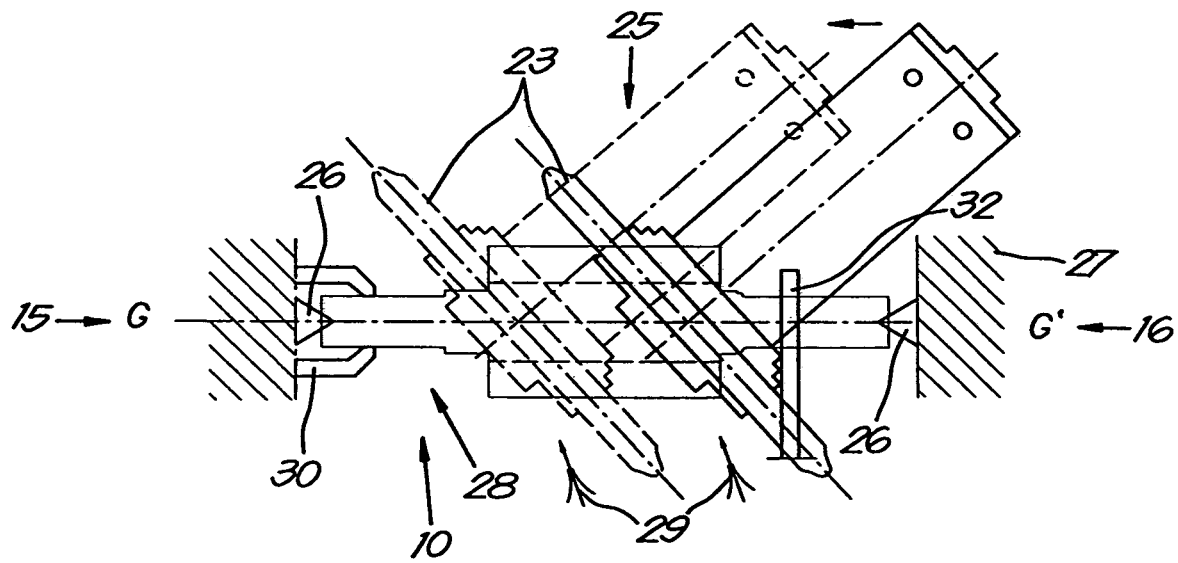
Figure 13:
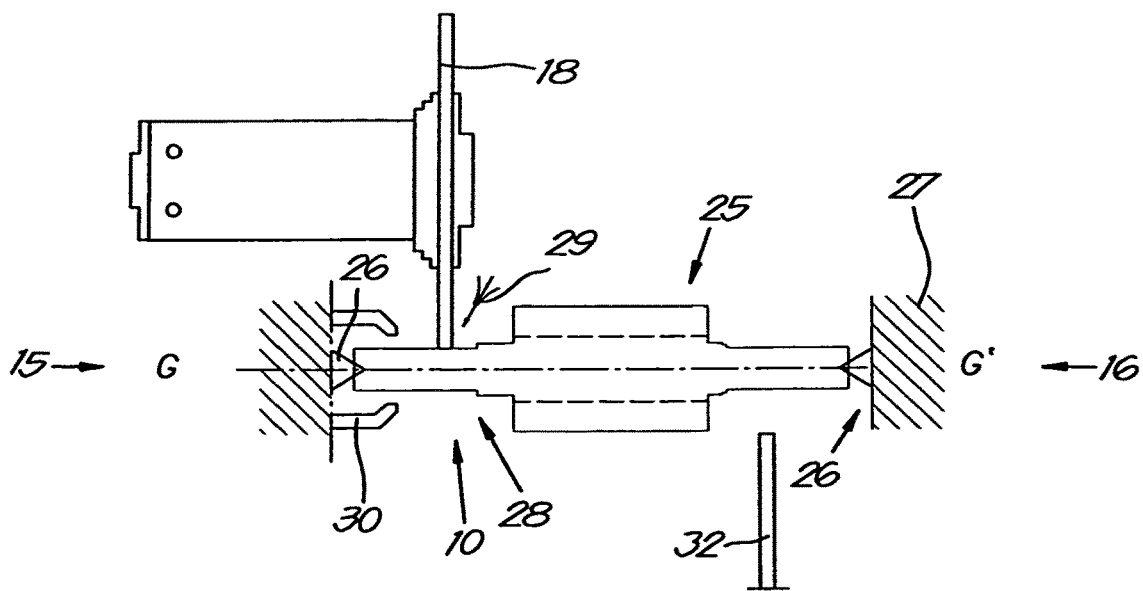
FIG. 13 illustrates a last cylindrical grinding operation of the method.

This is shown in FIGS. 11 and 12, again for manufacturing a male and female rotor 1 respectively for a screw compressor.

In a subsequent step of the method, the finely ground spiral toothing 6 can be deburred, for example, by removing the fine burrs with a deburring brush 40.

Finally, in a last step of the method according to the invention, the clamping mechanism or clamping system 30 can be opened and pulled back and the supporting stay 32 removed, after which the clamping surface 28 can be finely ground in a last grinding operation by cylindrical grinding with a cylindrical grinding disk 18 of the grinding machine 27 to form a finely ground section 10 for fitting a bearing.

It is clear that in this way a rotor 1 can be manufactured without having to unclamp the workpiece 25, which brings about the intended advantages as set out in the introduction.

In summary it can be said that a method according to the invention preferably comprises the following steps whereby the following order of operations is preferably followed:

the cylindrical grinding of a clamping surface 28 for a clamping mechanism or clamping system 30;

the cylindrical grinding of a support surface 31 for a stay 32;

the coarse profile grinding of the rotor body 3;

the cylindrical grinding of one or both end faces 4 and 5 of the rotor body 3, whereby the large burrs on both surfaces are at least partially removed at the same time;

the cylindrical grinding of the less critical shaft diameters of the rotor 1;

the cylindrical grinding of the bearing surfaces 10 and 11;

the cylindrical grinding of the outside diameter D of the rotor body 3, whereby the large burrs are at least partially removed at the same time;

the fine profile grinding of the rotor body 3, the fine cylindrical grinding of the clamping surface 28 for the clamping mechanism or clamping system 30, or in other words the section 10 at the end of the rotor shaft 2.

Of course the application of another order of operations and/or the addition of operations and/or elimination of operations, are not excluded according to the invention.

According to a preferred method according to the invention the method is at least partially automated.

Figure 14:
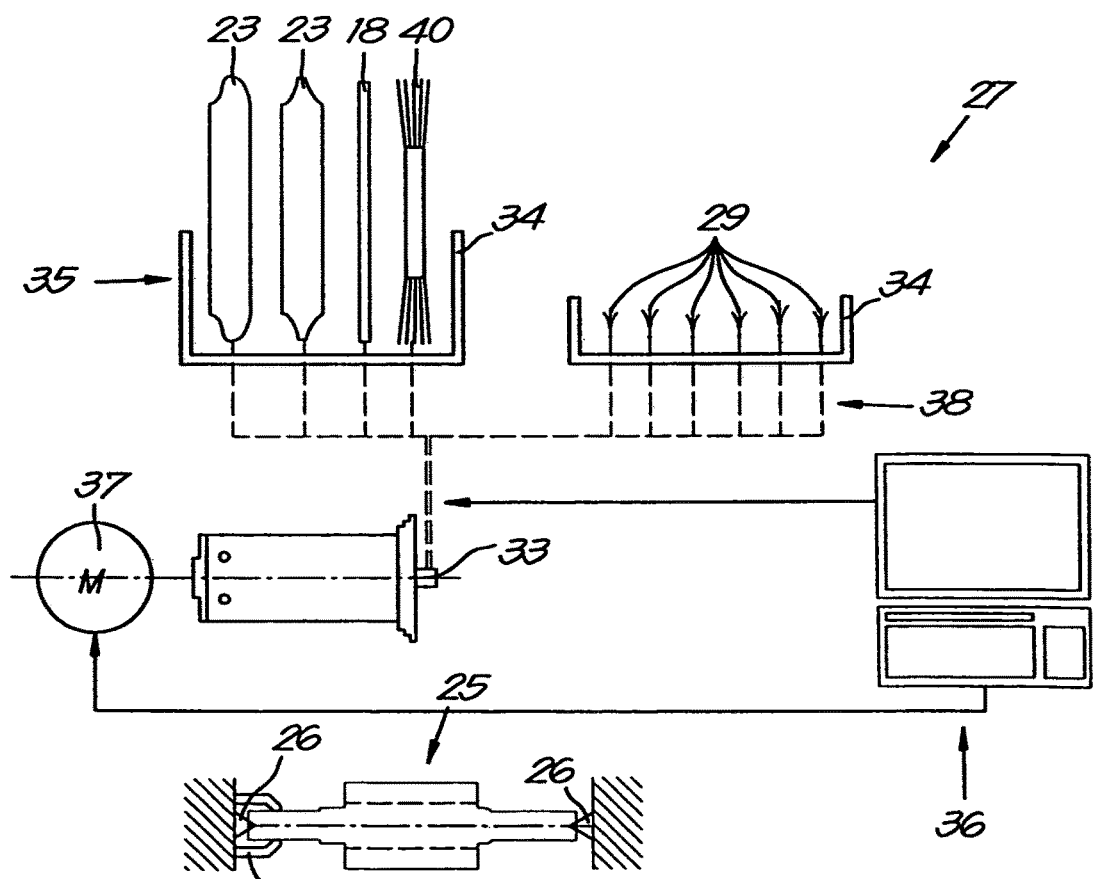
FIGS. 14 and 15 show two possible embodiments of a grinding machine according to the invention.

According to the invention use can be made of a grinding machine 27 to manufacture a rotor of a compressor, an example of which is shown in FIG. 14.

This grinding machine 27 has clamping means in the form of centre points 26 and a withdrawable clamping mechanism or clamping system 30 for clamping a workpiece 25, but they can just as well take on another form.

Moreover, the grinding machine 27 has one universal grinding spindle 33 and a number of exchangeable cylindrical grinding disks 18 and a number of exchangeable profile grinding disks 23, as well as a number of deburring brushes 40, that are contained in a magazine 34 of an automated exchanger 35 of the grinding machine 27.

There are also a number of exchangeable flushports 29 or a number of sets of exchangeable flushports 29 in the magazine 34 of the exchanger 35, that may or may not be exchanged at the same time with the grinding disk 18 or 23.

During the manufacture of a rotor 1, the tool exchanger 35 is intended to affix the exchangeable grinding disks 18 or 23, or the deburring brushes 40, from the magazine 34 to the universal grinding spindle 33 of the grinding machine 27 or vice versa.

In this way a method according to the invention can be applied whereby a grinding disk, either a cylindrical grinding disk 18 or a profile grinding disk 23, or a deburring brush 40, is removed from the universal grinding spindle 33 after performing an operation and another tool, either a cylindrical grinding disk 18, a profile grinding disk 23, or a deburring brush 40 is placed on this universal grinding spindle 33 to perform a subsequent grinding operation.

Preferably a flushport 29 or a set of flushports (for example, according to FIG. 16) is also exchanged between two grinding operations, or alternatively such a flushport 29 or set of flushports 29 can just be positioned differently.

Moreover, the grinding machine 27 has a control 36 for automatically performing grinding operations for the manufacture of the rotor 1.

FIG. 14 schematically presents this control 36, but such a control 36 can for example consist of a computerised system for controlling all types of motors 37 of the universal grinding spindle 33, or robot arms for moving grinding disks 18 and 23, and/or deburring brushes 40 and/or flushports 29 and so on.

To close, the grinding machine 27 also has switching means 38 that enable switching between at least two operating modes, more specifically between a first operating mode for grinding with a cylindrical grinding disk 18 and a second operating mode for grinding with a profile grinding disk 23, all such that the workpiece 25 does not have to be unclamped for the changeover between the possible operating modes.

The switching means 38 preferably enables the grinding machine 27 to switch to an additional operating mode for deburring a workpiece 25 with a deburring brush 40.

The switching means 38 and the tool exchanger 35 can again be realised in a thousand and one ways according to the arts of automation, and are preferably controlled by the control 36.

The grinding machine 27 also preferably has one or more positionable and/or exchangeable flushports 29 or set of flushports 29 that are also controlled by the control 36.

Figure 15:
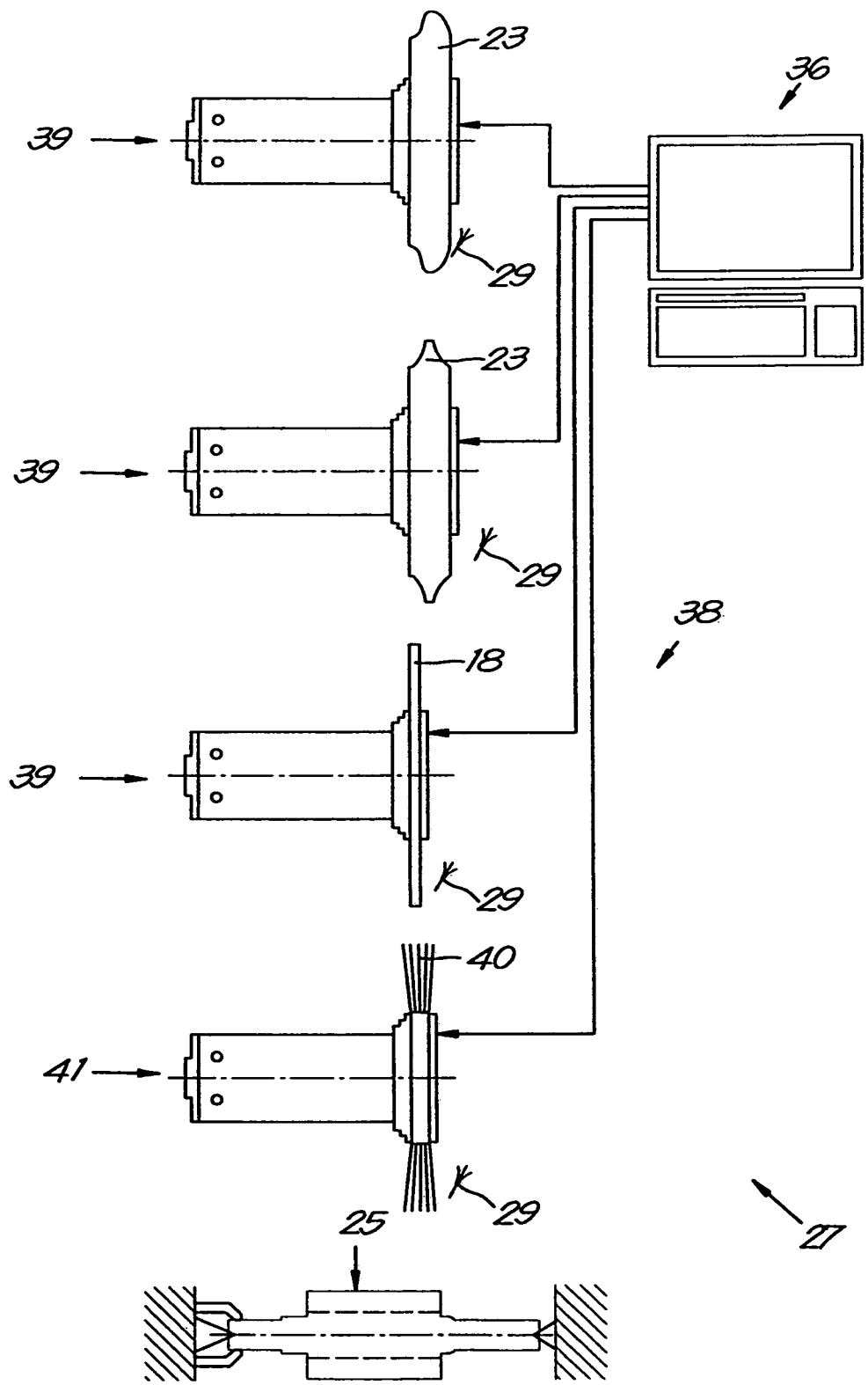

FIG. 15 shows another embodiment of a grinding machine 27.

This grinding machine 27 has one or more task-specific grinding spindles 39 that each have a specific grinding disk, either a cylindrical grinding disk 19 or a profile grinding disk 23, and an appropriate flushport set 29.

The grinding machine 27 also has one or more separate deburring brushes 40 that is or are placed on a deburring brush spindle 41 suitable for this purpose.

Moreover, this grinding machine 27 has a control 36 and switching means 38 for switching between the different operating modes, as in the previous case.

The intention here is that during the manufacture of a rotor 1, the control 36 controls a task-specific grinding spindle 39 or a deburring brush spindle 41 without a specific grinding disk 18, 23 or deburring brush 40 being exchanged on its task-specific grinding spindle 39 or deburring brush spindle 41 concerned.

In this way a method according to the invention can be realised in which a first grinding operation is performed using a first specific grinding disk 18 or 23 that is mounted beforehand on a first task-specific grinding spindle 39 of the grinding machine 27, and a second grinding operation is performed using a second specific grinding disk 18 or 23 that is mounted beforehand on a second task-specific grinding spindle 39 of the grinding machine 27 and/or a deburring operation is done using a deburring brush 40 that is mounted beforehand on a deburring brush spindle 41 of the grinding machine 27.

Preferably in such a method, both for the aforementioned first and second grinding operations, a flush is applied by making use of a first and second flushport or set of flushports 29 respectively, and these first and second flushports or set of flushports 29 are mounted on the grinding machine 27 beforehand such that a flush can be projected to the workpiece 25 in the vicinity of the first and second grinding disk 18 and/or 23 respectively.

It is clear that the ideas behind the embodiments of FIGS. 14 and 15 can be combined by combining one or more universal grinding spindles 33 with one or more task-specific grinding spindles 39 and/or deburring brush spindles 41 in one grinding machine 27.

The present invention is by no means limited to the method for manufacturing a screw rotor 1 of a compressor, a blower, a vacuum pump, or an expander, described as an example and illustrated in the drawings, but such a method according to the invention can be realised in all kinds of variants, without departing from the scope of the invention.

The invention claimed is:

1. A method for manufacturing a screw rotor for a compressor, a blower, a vacuum pump, or an expander, the method comprising the following operations:

clamping a workpiece into a grinding machine to perform a grinding operation, the workpiece having been partially processed so that before being clamped into the grinding machine, along an axis of the workpiece, the workpiece has a general cross-sectional shape of a rotor;

performing one or more cylindrical grinding operations including cylindrical grinding with one or more cylindrical grinding disks including a first cylindrical grinding disk and a second cylindrical grinding disk, wherein one or more sections of the workpiece are ground to respective one or more diameters to form one or more rotor shaft sections;

performing one or more profile grinding operations, wherein, in said one or more profile grinding operations, with one or more profile grinding disks including a coarse profile grinding disk and a fine profile grinding disk, a section of the workpiece is profiled to form a rotor body of the screw rotor;

wherein during the manufacture of the screw rotor in the grinding machine, the workpiece is not unclamped and both the cylindrical grinding operations and the profile grinding operations are executed with the same grinding machine, wherein performing the one or more cylindrical grinding operations includes a first cylindrical grinding operation that includes cylindrically grinding with the first cylindrical grinding disk a first section on at least a first end of the workpiece to obtain a cylindrical clamping surface that is centred with respect to a centre line of the workpiece along the axis of the workpiece, wherein performing the one or more cylindrical grinding operations further includes a second cylindrical grinding operation that includes cylindrically grinding with the first or second cylindrical grinding disks a second section on at least a second end of the workpiece, the second end of the workpiece being opposite from the first end of the workpiece, to obtain a cylindrical support surface that is centred with respect to the centre line of the workpiece along the axis of the workpiece, and wherein performing the one or more profile grinding operations includes clamping the workpiece at the first end at the cylindrical clamping surface to provide rotational support to the workpiece during the profile grinding by controlling rotation of the workpiece during the profile grinding operations to form the rotor body of the screw rotor, wherein performing the one or more profile grinding operations includes a first coarse profile grinding operation using the coarse profile grinding disk to obtain on the workpiece a coarsely ground rotor body having a coarsely finished spiral toothing, wherein, after said first coarse profile grinding operation, said method further comprises performing a third cylindrical grinding operation that includes grinding said one or more rotor shaft sections or grinding an end face of the rotor body, wherein after said third cylindrical grinding operation is performed, the one or more profile grinding operations includes a second profile grinding operation that includes finely grinding the profile of the rotor body using the fine profile grinding disk during a fine profile grinding operation to obtain on the workpiece a finely ground rotor body having a finely finished spiral toothing, and wherein said providing rotational support to the workpiece during said one or more profile grinding operations includes driving the workpiece around the axis of the workpiece by a clamp clamped at said cylindrical clamping surface during said first profile grinding operation and during said second profile grinding operation.

2. The method according to claim 1, wherein the clamping of the workpiece comprises the steps of making a centre hole in each of the two ends of the workpiece and clamping the workpiece in between two centre points of the grinding machine.

3. The method according to claim 1, further comprising a deburring operation, the deburring operation being performed with said grinding machine.

4. The method according to claim 3, wherein during the manufacture of a rotor according to the method, a universal grinding spindle of the grinding machine is used, and wherein a deburring brush is placed on the universal grinding spindle to perform said deburring operation.

5. The method according to claim 1, wherein during the manufacture of a rotor according to the method, a universal grinding spindle of the grinding machine is used, wherein the first or the second cylindrical grinding disk is removed from the universal grinding spindle and the coarse or fine profile grinding disk is placed on the universal grinding spindle.

6. The method according to claim 5, wherein a flushport or a set of flushports is exchanged or positioned differently between two grinding operations.

7. The method according to claim 6, wherein in the profile and cylindrical grinding operations a flush is applied by using the flushport or the set of flushports, the flushport or the set of flushports being mounted on the grinding machine beforehand such that a flush can be projected to the workpiece in the vicinity of the coarse or fine profile grinding disks and first or second cylindrical grinding disks in order to clean the grinding disk concerned, to provide a coolant, to provide a lubricant, and/or to extinguish sparks during grinding.

8. The method according to claim 1, wherein during the manufacture of a rotor with the method, a first grinding operation is performed using a first grinding disk that is mounted beforehand on a first grinding spindle of the grinding machine, and a second grinding operation is performed using a second grinding disk that is mounted beforehand on a second grinding spindle of the grinding machine.

9. The method according to claim 1, wherein the method is fully automated.

10. The method according to claim 1, further comprising fitting a support stay to the workpiece near the second end by the support stay being affixed around the cylindrical support surface to support the workpiece in a rotating way, wherein the support stay is supported on bearings or the stay is a sliding stay that is fitted around the cylindrical support surface, and wherein the support stay is arranged to support the workpiece to accommodate forces that occur during the profile grinding by preventing or limiting bending of the workpiece during the profile grinding.

11. The method according to claim 1, wherein said third cylindrical grinding operation further includes grinding one or both end faces of the rotor body.

12. The method according to claim 1, wherein during said one or more cylindrical grinding operations, the workpiece is obliquely ground with first or second cylindrical grinding disks or a third cylindrical grinding disk that has a profile such that a part of the rotor shaft section is ground to the predetermined diameter and a radially oriented surface is ground on the rotor shaft section at the same time.

13. The method according to claim 1, wherein the third cylindrical grinding operation includes grinding said one or more rotor shaft sections.

14. A method for manufacturing a screw rotor for a compressor, a blower, a vacuum pump, or an expander, the method comprising the following operations:

clamping a workpiece into a grinding machine to perform a grinding operation, the workpiece having been partially processed so that before being clamped into the grinding machine, along an axis of the workpiece, the workpiece has a general cross-sectional shape of a rotor;

performing one or more cylindrical grinding operations including cylindrical grinding with a cylindrical grinding disk, wherein one or more sections of the workpiece are ground to respective one or more diameters to form a rotor shaft section;

performing one or more profile grinding operations, wherein, in said one or more profile grinding operations, with a profile grinding disk, a section of the workpiece is profiled to form a rotor body of the screw rotor;

wherein during the manufacture of the screw rotor in the grinding machine, the workpiece is not unclamped and both the cylindrical grinding operations and the profile grinding operations are executed with the same grinding machine, wherein performing the one or more cylindrical grinding operations includes a first cylindrical grinding operation that includes cylindrically grinding with the cylindrical grinding disk a first section on at least a first end of the workpiece to obtain a cylindrical clamping surface that is centred with respect to a centre line of the workpiece along the axis of the workpiece, wherein performing the one or more cylindrical grinding operations further includes a second cylindrical grinding operation that includes cylindrically grinding with the cylindrical grinding disk a second section on at least a second end of the workpiece, the second end of the workpiece being opposite from the first end of the workpiece, to obtain a cylindrical support surface that is centred with respect to the centre line of the workpiece along the axis of the workpiece, and wherein performing the one or more profile grinding operations includes clamping the workpiece at the first end at the cylindrical clamping surface to provide rotational support to the workpiece during the profile grinding by controlling rotation of the workpiece during the profile grinding operations to form the rotor body of the screw rotor, and wherein the following order of operations is followed:

coarsely grinding a coarse profile of the rotor body;

cylindrically grinding one or both end faces of the rotor body;

cylindrically grinding the cylindrical support surface;

cylindrically grinding diameters of the rotor other than said one or both end faces of the rotor body or a contour of the rotor body;

cylindrically grinding the bearing surfaces including cylindrically grinding a first bearing surface toward the first end of the workpiece and a second bearing surface toward the second end of the workpiece;

cylindrically grinding an outside diameter of the rotor body; and finely grinding a fine profile of the rotor body.

15. The method according to claim 14, further comprising an operation of deburring the rotor body, wherein the deburring of the rotor body is performed after the operation of coarsely grinding the coarse profile of the rotor body.

16. The method according to claim 15, wherein the deburring is performed in part by the cylindrical grinding of the one or both end faces of the rotor body and/or the outside diameter of the rotor body.

17. The method according to claim 14, wherein the cylindrical clamping surface is ground before the coarse profile grinding of the rotor body.

18. The method according to claim 17, wherein after the fine profile grinding of the rotor body the following step is done:

finely grinding the cylindrical clamping surface.

19. The method according to claim 14, wherein a stay support surface is cylindrically ground for a stay before the coarse profile grinding of the rotor body.

20. A method for manufacturing a male screw rotor and a complementary female screw rotor, wherein each of the male screw rotor and the female screw rotor are manufactured according to the method of claim 1, and wherein the male screw rotor and the female screw rotor are manufactured in the grinding machine by changing an orientation of profile grinding disks of the single grinding machine.

* * * * *